United States Patent [19]
Yasui et al.

[11] Patent Number: 5,944,553
[45] Date of Patent: Aug. 31, 1999

[54] FLAT CABLE CONNECTION STRUCTURE

[75] Inventors: Katsu Yasui; Hideki Adachi, both of Shizuoka-ken, Japan

[73] Assignee: Yazaki Corporation, Tokyo, Japan

[21] Appl. No.: 08/861,822

[22] Filed: May 23, 1997

[30] Foreign Application Priority Data

May 27, 1996 [JP] Japan .................................. 8-132125

[51] Int. Cl.$^6$ ............................................. H01R 9/07
[52] U.S. Cl. ............................................ 439/495; 439/492
[58] Field of Search .................................... 439/496, 495, 439/492, 499, 497

[56] References Cited

U.S. PATENT DOCUMENTS

| | | | |
|---|---|---|---|
| 3,084,302 | 4/1963 | Braeutigam | 439/496 |
| 5,397,247 | 3/1995 | Aoki et al. | 439/496 |
| 5,752,851 | 5/1998 | Zaderej et al. | 439/493 |

FOREIGN PATENT DOCUMENTS

| | | |
|---|---|---|
| 64-21988 | 2/1989 | Japan . |
| 7-169519 | 7/1995 | Japan . |

*Primary Examiner*—Paula Bradley
*Assistant Examiner*—Katrina Davis
*Attorney, Agent, or Firm*—Finnegan, Henderson, Farabow, Garrett & Dunner, L.L.P.

[57] ABSTRACT

Bus bars are integrally fitted to a resin-made bus-bar holder by molding, conductor exposed sections of a flat cable and conductor exposed sections of wires are connected to these bus bars either by welding or by soldering, and the flat cable is inverted to the rear surface of the bus-bar holder and is sandwiched between the bus-bar holder and an under case. With this structure, a tensile force of the flat cable is not directly applied to the connection portion, and a connection structure of the flat cable with high reliability can be provided at low cost.

4 Claims, 5 Drawing Sheets

FLAT CABLE CONNECTION STRUCTURE

BACKGROUND OF THE INVENTION

The present invention relates to a connection structure of a flat cable, and relates more particularly to a connection structure for connecting a flat cable with other conductor both electrically and mechanically.

According to an example (a first example) of the connection structure of a flat cable as described in the Japanese Utility Model Registration application laid-open Publication No. JP-A-7-169519, conductor exposed sections of a flat cable are superimposed on a base member on which a terminal is disposed, a cover is set on this setting, and the conductor exposed sections and the terminal 50 are combined with each other by welding or soldering through holes provided on the base member and the cover.

Further, according to another example (a second example) of the connection structure of a flat cable as described in the Japanese Utility Model Registration application laid-open Publication No. JP-A-64-21988, conductor exposed sections of a flat cable are connected with a lead wire by a joint bar held by an insulation supporting unit, and the whole of this connection section is molded.

According to the above first example, however, when a tensile force is applied to the flat cable, this force is directly applied to a portion of the connection between the conductor exposed sections and the terminal, so that there arises a problem of reliability of the connection intensity.

Further, according to the above second example, although the intensity is increased by the molding, there is a problem of an increase in the manufacturing cost.

SUMMARY OF THE INVENTION

With a view to obviating the above-described problems, it is an object of the present invention to provide a connection structure of a flat cable according to which a tensile force of a flat cable is not directly applied to a connection portion and which has a high reliability and which can be manufactured at low cost.

In order to achieve the above-described object of the present invention, a connection structure of a flat cable is provided which includes a bus-bar holder, bus bars molded in the front side of the bus-bar holder, a wire holder having wires held in it, a flat cable which is conductively connected to the wires, an under case for accommodating the bus-bar holder, and an upper case for accommodating the wire holder. Conductor exposed sections of the flat cable and conductor exposed sections of the wires are coupled to the bus bars of the bus-bar holder, and the flat cable is inverted from the front side of the bus-bar holder to the rear side thereof and is sandwiched between the bus-bar holder and the under case.

Under the above-described structure, the conductor exposed sections of the flat cable and the conductor exposed sections of the wires are coupled to the bus bars of the bus-bar holder, and the flat cable coupled to the bus bars is returned to the rear side of the bus bars so that the flat cable is sandwiched between the bus-bar holder and the under case. Accordingly, even if a tensile force is applied to the flat cable, this force is not directly applied to the portion of coupling with the bus bars, so that a coupling state which is highly reliable both electrically and mechanically can be obtained. Further, the connection structure can be manufactured at low cost since it is not necessary to mold the whole structure.

Further, it is also possible to arrange such that, in the bus-bar holder, a plurality of partition panels are provided to face each other so that a groove is formed between the partitions, the bus bars are molded in the groove between the partitions, the conductor exposed sections of the flat cable and the conductor exposed sections of the wires are engaged with the grooves to bring these conductor-exposed sections into contact with the bus bars, and they are coupled to the bus bars by either welding or soldering.

Under the above-described structure, the conductor exposed sections of the flat cable and the conductor exposed sections of the wires are engaged with the grooves and the exposed conductors are coupled to the bus bars by either welding or soldering. Accordingly, it is possible to achieve a secure electrical coupling without the risk of short-circuiting of each conductor.

Further, it is also possible to arrange such that, in the wire holder, first grooves in which the conductor exposed sections of the wires are engaged and second grooves in which insulation cover sections of the wires are engaged are provided, and the first grooves are formed in a pitch which is the same as that of the grooves of the bus-bar holder and the second grooves are formed in a pitch which is wider than that of the first grooves.

According to the above-described structure, when the wire holder is fitted to the bus-bar holder, the conductor-exposed sections of the wires are necessarily positioned in the grooves of the bus-bar holder and the wires are fitted accurately. Further, since the second grooves are formed in a pitch wider than that of the first grooves, there is an increasing resistive force against the tensile force applied to the wires.

Further, it is also possible to arrange such that, in the under case, a plurality of grooves formed on the upper end of the rear wall section and a tapered surface formed in front of the grooves in a slope to decline towards the front, are provided, and the insulation cover section of the wires is engaged with the grooves and pressured by the tapered surface so that the insulation cover section is sandwiched in a state of being deformed along the tapered surface.

According to the above-described structure, since the insulation cover section is sandwiched between the under case and the upper case in a state of being deformed along the tapered surface of the under case, a tensile force is not applied to the coupling section of the wires and the wire installation strength is increased.

BRIEF DESCRIPTION OF THE PREFERRED EMBODIMENTS

Figure 1:
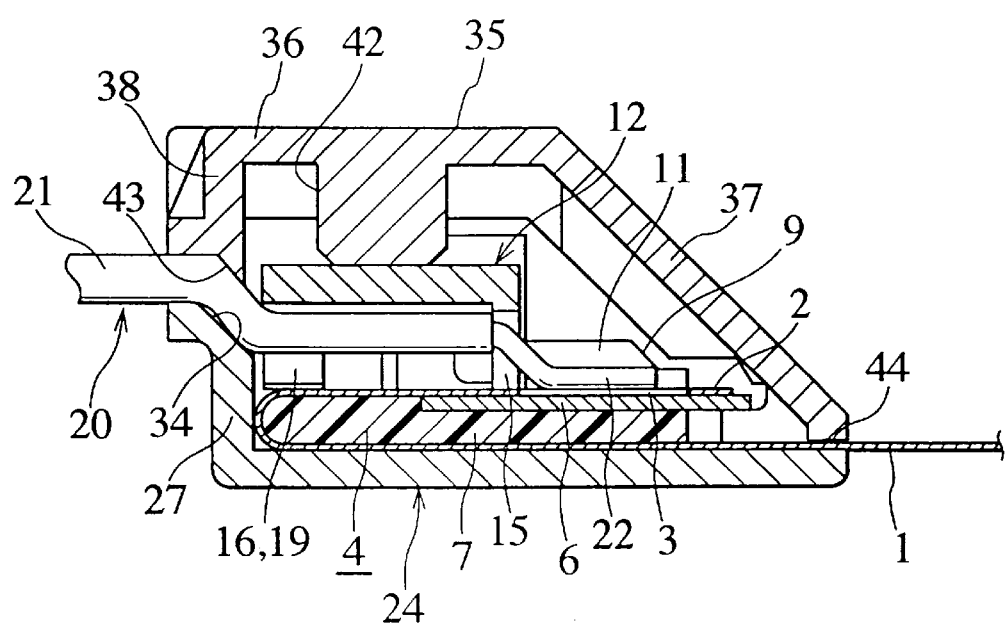
FIG. 1 is a longitudinal sectional view for showing the state of one embodiment of the present invention.

The present invention will be explained below based on the state of one embodiment shown in the drawings. FIG. 1 is a longitudinal sectional view for showing a state after an assembling, and FIGS. 2 to 4 are perspective views for showing assembly processes. The structure of each part and the assembling process will be explained in sequence with reference to FIG. 1.

Figure 2A:
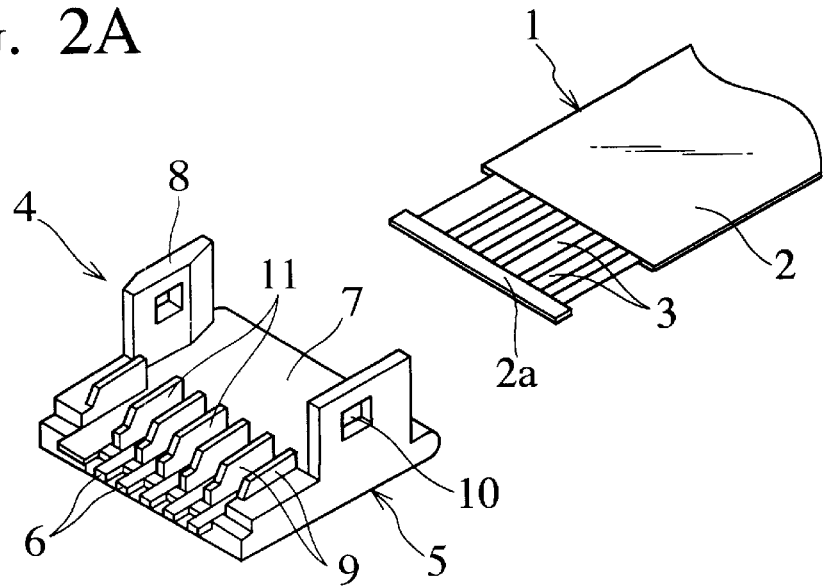
FIG. 2A is a perspective view for showing the process of assembling a flat cable to a bus-bar holder.
Figure 2B:
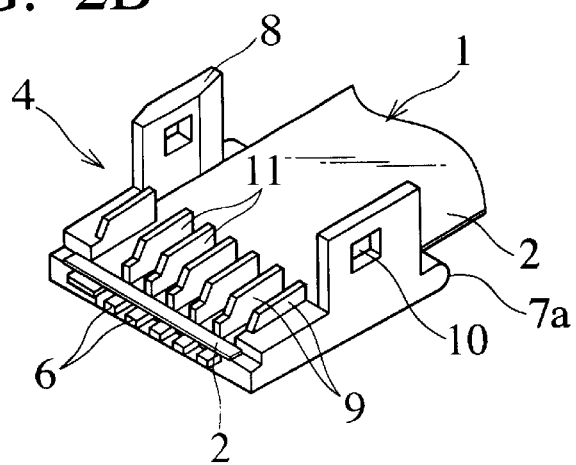
FIG. 2B is a perspective view for showing the process of assembling a flat cable to a bus-bar holder.
Figure 2C:
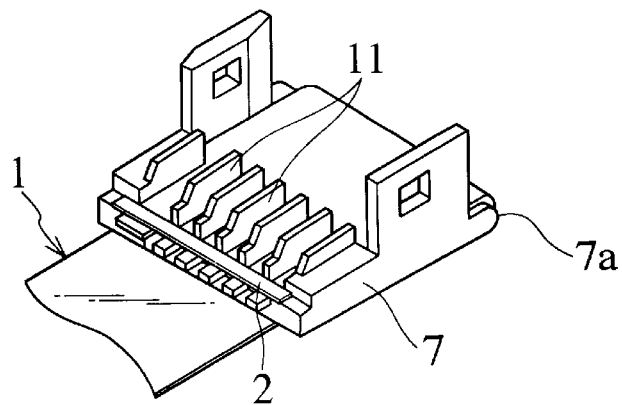
FIG. 2C is a perspective view for showing the process of assembling a flat cable to a bus-bar holder.

FIGS. 2A to 2C show the assembly process of the flat cable. In FIG. 2A, a flat cable 1 has conductor exposed sections 3 formed by leaving a remainder 2a of an insulation cover section 2.

A bus-bar holder 4 is structured by a resin-made holder main body 5 and bus bars 6 integrally fitted to the holder main body by molding. The bus bars 6 are arranged in the front side of the bus-bar holder 4. The holder main body 5 is structured by a substrate section 7, side wall sections 8 and 8 formed on both sides of the substrate 7, and a plurality of partitions 9 formed at the front portion. Engagement holes 10 and 10 are formed on the side wall sections 8 and 8. The bus bars 6 are molded in grooves 11 formed by the partitions 9.

In FIG. 2B, each of the conductor exposed sections 3 of the flat cable 1 is inserted into each groove 11 and is brought into contact with each bus bar 6. The remainder 2a of the flat cable 1 is stopped at the front end of the partitions 9 and the insulation cover section 2 is stopped at the rear side of the partitions 9.

In FIG. 2C, the flat cable 1 is returned at a rear end 7a of the substrate section 7 and is guided to the front through the lower surface of the substrate section 7. Namely, the flat cable 1 is inverted from the front side of the bus-bar holder to the rear side of thereof.

Figure 3A:
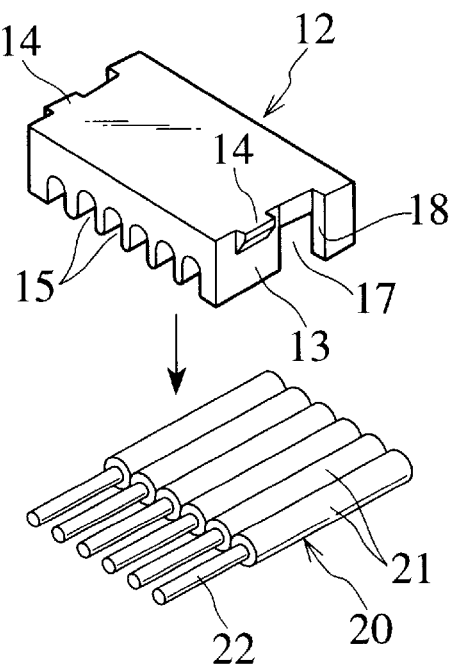
FIG. 3A is a perspective view for showing the process of assembling wires to a wire holder.
Figure 3B:
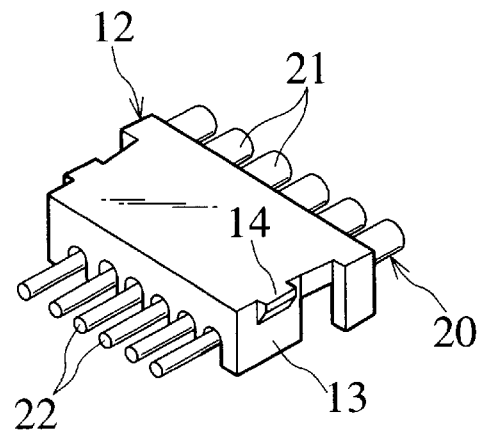
FIG. 3B is a perspective view for showing the process of assembling wires to a wire holder.
Figure 3C:
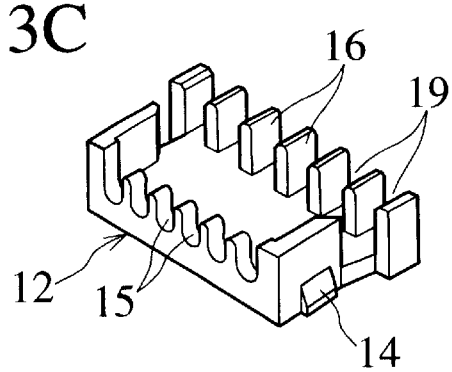
FIG. 3C is a perspective view for showing the process of assembling wires to a wire holder.

FIGS. 3A to 3C show the process of assembling the wires. In FIG. 3A, side walls 13 are formed on both sides of a wire holder 12, stop pieces 14 are formed on the upper end of the side wall sections 13, grooves (first grooves) 15 are formed at the lower side of the front surface, downward-facing projection pieces 16 are formed at the rear side, and grooves (second grooves) 19 are formed between the projection pieces 16 (reference FIG. 3C). In this case, the grooves 15 are formed in the same pitch as that of the grooves 11 of the bus-bar holder 4, and the grooves 19 are formed in a wider pitch than that of the grooves 15.

A groove 17 is formed at each of the side wall sections 13. The rear portion of the groove 17 becomes a guide section 18.

Referring to FIG. 3A, each wire 20 has a conductor exposed section 22 with its insulation cover section 21 removed.

The wires structured in the manner as described above are fitted to the wire holder 12 such that the conductor exposed sections 22 are engaged with the grooves 15 and the insulation cover sections 21 are engaged with the grooves 19 between the projection pieces 16.

Figure 4A:
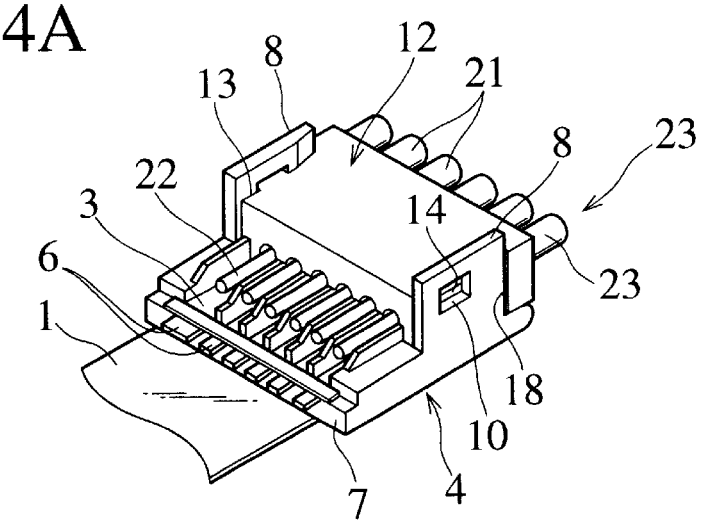
FIG. 4A is a perspective view for showing the process of assembling to an under case.
Figure 4B:
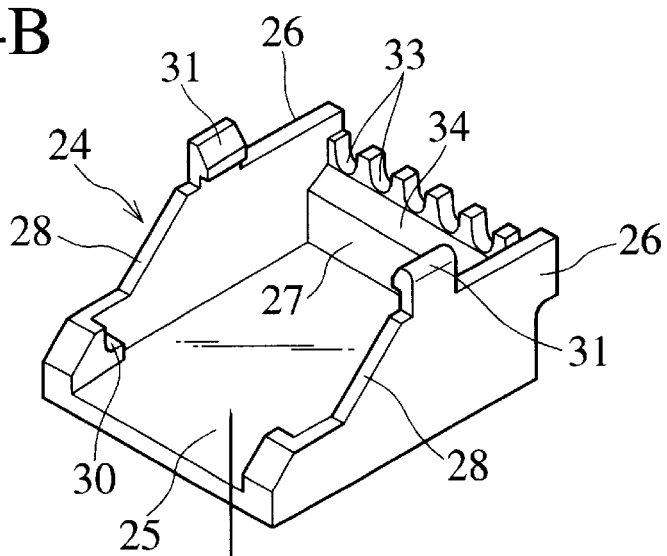
FIG. 4B is a perspective view for showing the process of assembling to an under case.
Figure 4C:
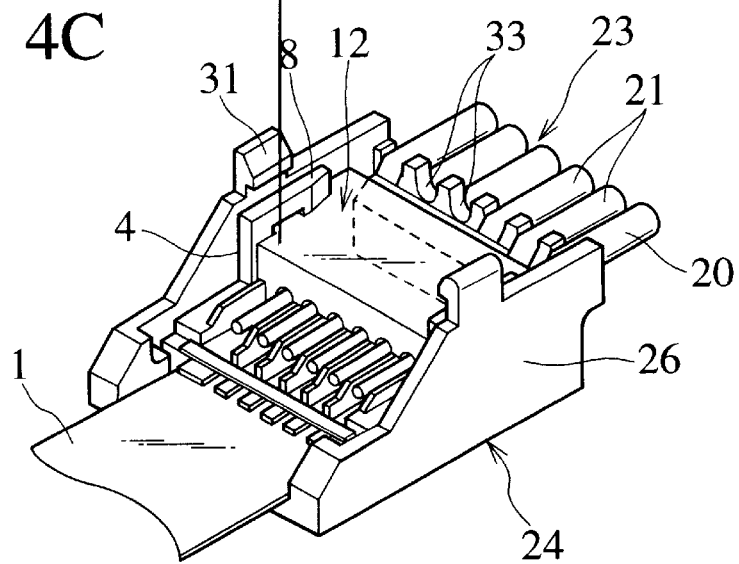
FIG. 4C is a perspective view for showing the process of assembling to an under case.

FIGS. 4A to 4C show the process of fitting the flat cable 1 and the wires 20 to the under case. In FIG. 4A, the wire holder 12 (FIG. 3B) in which the wires 20 are set is set on the bus-bar holder 4 (FIG. 2C) in which the flat cable 1 is set. The side wall sections 13 of the wire holder 12 are engaged between the side wall sections 8 and 8 of the bus-bar holder 4, and the guide section 18 is slid along the rear surface of the side wall sections 8 so that the stop pieces 14 are engaged with the engagement holes 10.

The conductor exposed sections 3 of the flat cable 1 are pressured against the bus bars 6 and the conductor exposed sections 22 of the wires 20 are pressured against the conductor exposed sections 3. The bus bars 6, the conductor exposed sections 3 and the conductor exposed sections 22 are connected together either by welding or by soldering, so that an assembly 23 as shown in FIG. 4A is structured.

In FIG. 4B, an under case 24 is structured by a bottom panel section 25, side wall sections 26 and 26 formed on both sides of the bottom panel section 25 and a rear wall section 27 formed at the rear side. In the front portion of the side wall sections 26, tapered sections 28 declining toward the front are formed, stages 30 are formed on the inner surface at the front end, and stoppers 31 and 31 are formed on the upper edge. On the upper end of the rear wall section 27, a plurality of grooves 33 are formed, and a tapered surface 34 declining toward the front is formed at the front portion of the grooves 33.

In FIG. 4C, the assembly 23 is fitted to the under case 24. In other words, the bus holder 4 is engaged between the side walls 26 and 26 of the under case 24, and the flat cable 1 is sandwiched between the substrate section 7 of the bus-bar holder 4 and the bottom panel section 25 of the under case 24 and the insulation cover sections 21 of the wires 20 are engaged in the grooves 33, as shown in FIG. 1.

Figure 5A:
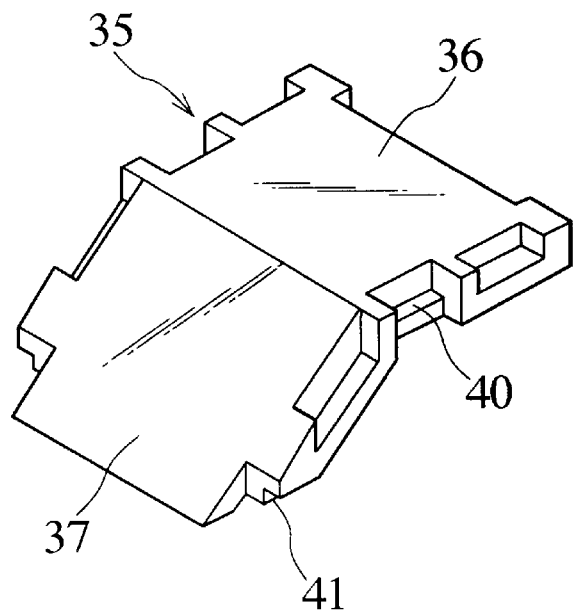
FIG. 5A is a perspective view for showing the process of assembling to an upper case.
Figure 5B:
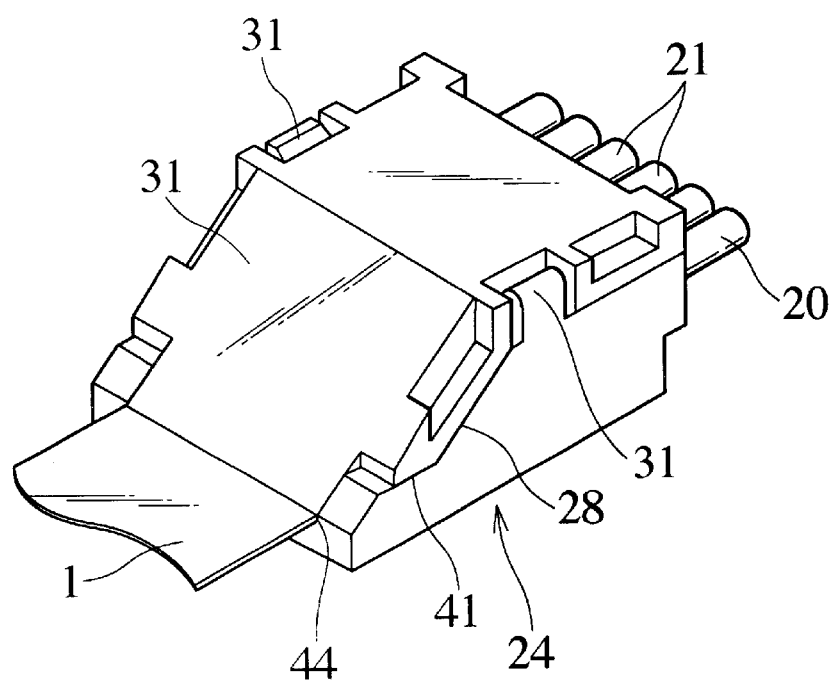
FIG. 5B is a perspective view for showing the process of assembling to an upper case.

An upper case 35 is mounted on the under case 24 in the state of FIG. 4C, as shown in FIG. 5B. When the upper case 35 is pressured on the under case 24, the stoppers 31 are engaged with engagement stages 40, and the wire holder 12 is pressured with a projection section 42 and the wires 20 are pressured against the tapered surface 34 of the under case 24 with a tapered section 43 so that the wires 20 are sandwiched in a state of being deformed downward, as shown in FIG. 1. Further, both ends of the tapered section 37 of the upper case 35 are engaged with the tapered section 28 of the under case 24 and recess sections 41 at the front end are engaged with the stage sections 30.

The flat cable 1 is guided from a gap 44 between the under case 24 and the upper case 35.

As described above, according to the connection structure of the flat cable in the state of the present embodiment, the bus-bar holder 4 to which the bus bars 6 are molded is used, and the flat cable 1 coupled to the bus bars 6 is returned to the rear side of the bus bars 6 and is sandwiched between the bus bar holder 4 and the under case 24. Therefore, even if a tensile force is applied to the flat cable 1, this force is not directly applied to the portion of connection with the bus bars 6. Accordingly, an electrically and mechanically highly reliable coupling state can be obtained. Further, since it is not necessary to mold the whole structure, the connection structure can be manufactured at low cost.

Further, since the bus bars 6 are molded in the grooves 11 between the partitions 9 of the bus-bar holder 4 and the conductor exposed sections 3 of the flat cable 1 and the conductor exposed sections 22 of the wires 20 are engaged with the grooves 11, there is no risk of short-circuiting of each conductor and the electrical coupling can be achieved securely.

Further, since the wire holder 12 has formed the grooves 15 of the same pitch as that of the grooves 11 of the bus-bar holder 4 and the grooves 19 of a wider pitch than that of the grooves 15 at the front and back sides of the wire holder 12 and the conductor exposed sections 22 of the wires 20 and the insulation cover section 21 are engaged with these grooves respectively, when the wire holder 12 is fitted to the bus-bar holder 4, the conductor-exposed sections 22 are necessarily positioned in the grooves 11 and the wires 20 are fitted accurately. Further, since the grooves 15 and 19 are formed in different pitches, there is an increasing resistive force against the tensile force applied to the wires 20.

Further, since the insulation cover sections 21 of the wires 20 are pressured to the tapered surface 34 of the under case 24 and are sandwiched between the under case 24 and the upper case 35 in the state of being deformed along the tapered surface 34, it is possible to provide a structure in which a tensile force does not affect the coupling section of the wires 20.

Although the above embodiment shows the case where the flat cable 1 is connected to the wires 20, the conductor to which the flat cable is connected is not limited to the state of the above embodiment but may be any other conductor.

What is claimed is:

1. A connection structure for a flat cable, comprising:

a bus-bar holder having front and rear sides, bus bars molded in the front side of said bus-bar holder, an electric wire holder fitted with a plurality of wires, a flat cable conductively connected to said wires, an under case for accommodating said bus-bar holder, and an upper case for accommodating said wire holder, wherein conductor exposed sections of said flat cable and conductor exposed sections of said wires are coupled to said bus bars of said bus-bar holder, and said flat cable is inverted from the front side of said bus-bar holder to the rear side thereof and is sandwiched between said bus bar holder and said under case.

2. A connection structure for a flat cable, according to claim 1, wherein said bus-bar holder has a plurality of partitions faced with each other to form a groove between adjacent partitions, said bus bars are molded in said grooves between said partitions, and said conductor exposed sections of said flat cable and said conductor exposed sections of said wires are engaged with said grooves, brought into contact with said bus bars, and are coupled with said bus bars either by welding or by soldering.

3. A connection structure for a flat cable, according to claim 2, wherein said wire holder has first grooves with which said conductor exposed sections of wires are engaged and second grooves with which insulation cover sections of said wires are engaged, said first grooves and said grooves of said bus-bar holder are formed in a same pitch, and said second grooves are formed in a wider pitch than that of said first grooves.

4. A connection structure for a flat cable, according to claim 1, wherein said under case has a plurality of grooves formed on the upper end of a rear wall section and a tapered surface formed in front of said grooves and declining toward the front, and said insulation cover sections of said wires are engaged with said grooves, pressured to said tapered surface, and are sandwiched in a state of being deformed along said tapered surface.

* * * * *